INVENTOR.
Albert J. Werner
BY *Clarence R. Patty J.*
ATTORNEY

INVENTOR.
Albert J. Werner
BY Clarence R Petty
ATTORNEY

United States Patent Office 3,201,010
Patented Aug. 17, 1965

3,201,010
HOMOGENEOUS BATCH FEEDING
Albert J. Werner, Greenville, Ohio, assignor to Corning Glass Works, Corning, N.Y., a corporation of New York
Filed Aug. 21, 1963, Ser. No. 303,609
2 Claims. (Cl. 222—464)

This invention relates to improved method and apparatus for feeding granular material from a storage bin to a delivery point, and more particularly to a method of and means for blending granular batch material during delivery from a storage bin to a glass melting furnace, to inhibit segregation of the various-sized granules.

In the past it has been common practice in the glass industry to feed glass furnaces with batch material from a bin which has been previously filled with the desired mixture of such batch material. However, I have found that the various granular materials making up such mixture have a tendency to segregate when they are loaded into the bin. As the falling materials fill the bin, they form a pile having a center core composed of fine, usually dense material, such as sand, fluorspar, and alumina. The larger, lighter materials, such as borax and boric acid, tend to slide toward the edges of the pile, with the very coarse-grained material, such as sodium nitrate and arsenic, rolling to the outermost edge.

When the outlet or discharge hole at the bottom of the bin is opened, the center core of fine material, induced to a degree by the slip planes created by segregation, moves downwardly along the length of the bin and outwardly through the discharge hole as a segregated mass to the glass melting furnace. On top of this mass of fine, silica-rich material, comes the medium and coarse granules of borax, boric acid, and sodium nitrate material, filling the void left by the fines. Since the various grain sizes leave the bin at different times, uneven melting and poor property control result in the glass melting furnace.

In an endeavor to alleviate this problem, I attempted utilizing more than one hole in the bottom of the bin, however, the results were not satisfactory since a concentration of coarse material inevitably followed the discharge. Additional attempts to alleviate this problem of segregation inclding the utilization of a capsule-shaped form suspended above the unloading hole, a baffle in the top of the bin to spray the batch on the pile, and assorted deflectors, did not solve the basic problem of segregation, wherein a mass of fine batch material initially flowed from the bin followed by coarse material.

However, after much research and experimentation, I arrived at a solution to the problem of batch segregation, which has been plaguing the glass industry for many years. Basically, the concept of my invention includes the blending of the fine material from the center of the bin with the coarse material from adjacent the side thereof, as the bin is unloaded. I conceived and developed a device which may be easily and economically positioned within and secured to the bottom of standard existing storage or day bins. The device is composed essentially of a central hopper or box having an upwardly open portion for receiving the fine materials from adjacent the center of the bin, and a plurality of upwardly-inclined passages or arms communicating at their lower end with the hopper, and terminating at their upper end in open communication adjacent side wall portions of the bin, for receiving coarse material. The arms or passages deliver coarse materials from adjacent such sides to the hopper, where they are blended with the fines entering the hopper, so that a substantially homogeneous or blended mixture may be discharged through the standard outlet opening formed in the bottom of the bin.

It thus has been an object of my invention to solve the problem of segregation heretofore plaguing the glass industry in feeding granular batch materials to a glass melting tank.

A further object of my invention has been to provide novel method and apparatus for blending granular batch material as it is delivered from the storage bin to a glass melting tank to inhibit segregation of the various granules and provide a substantially homogeneous batch mixture to the melting tank.

These and other objects of my invention will be more apparent to those skilled in the art from the following specification and accompanying drawings in which.

Figure 1:
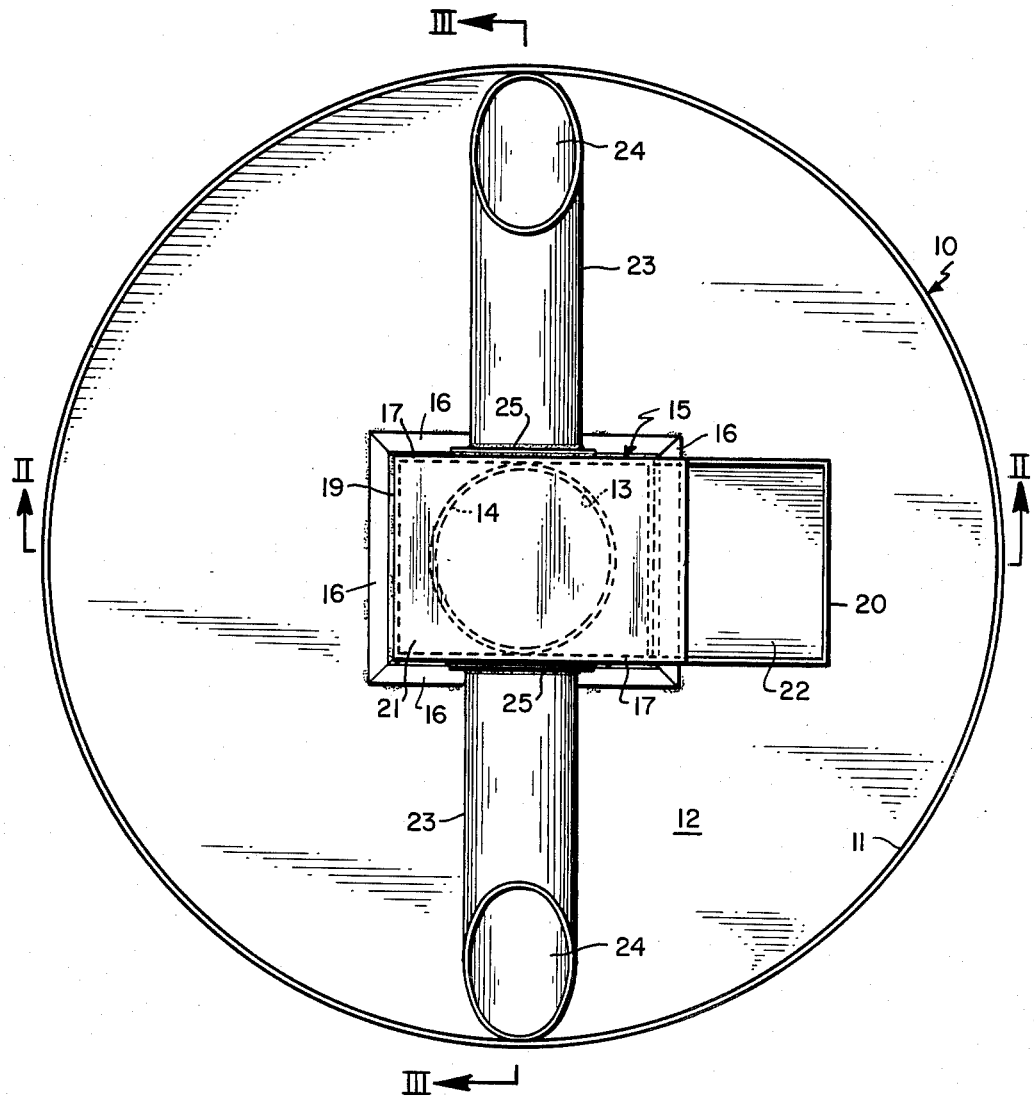
FIG. 1 is a top plan view of a batch blending and delivery device embodying my invention, positioned within a standard storage bin.
Figure 2:
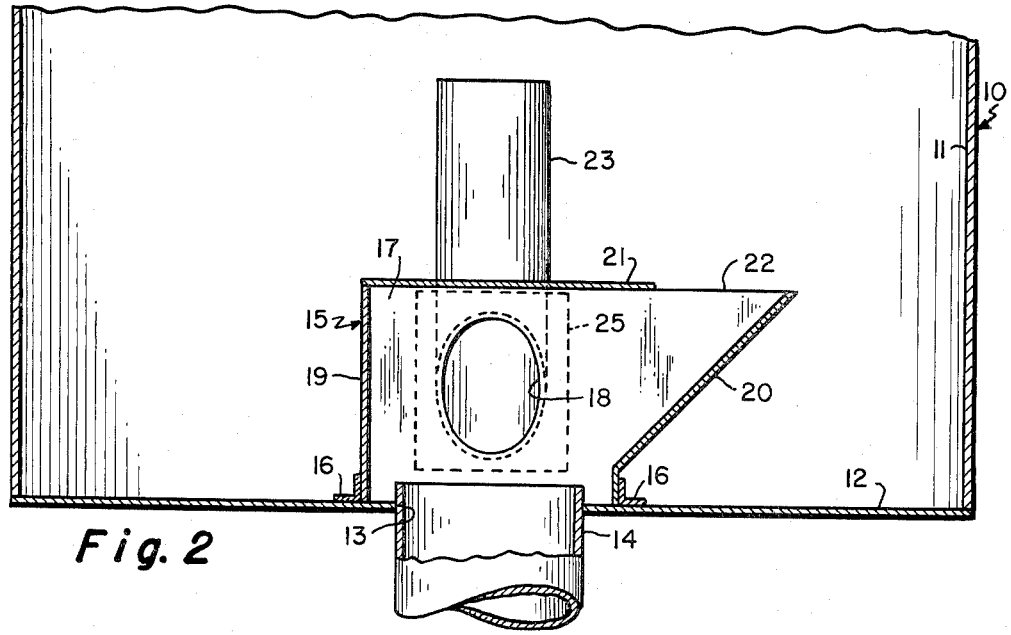
FIG. 2 is an elevational view in section of the homogeneous batch feeder tank along lines II—II of FIGURE 1; and, FIG. 3 is an elevational view in section of the feeder or blending device taken along lines III—III of FIGURE 1.
Figure 3:
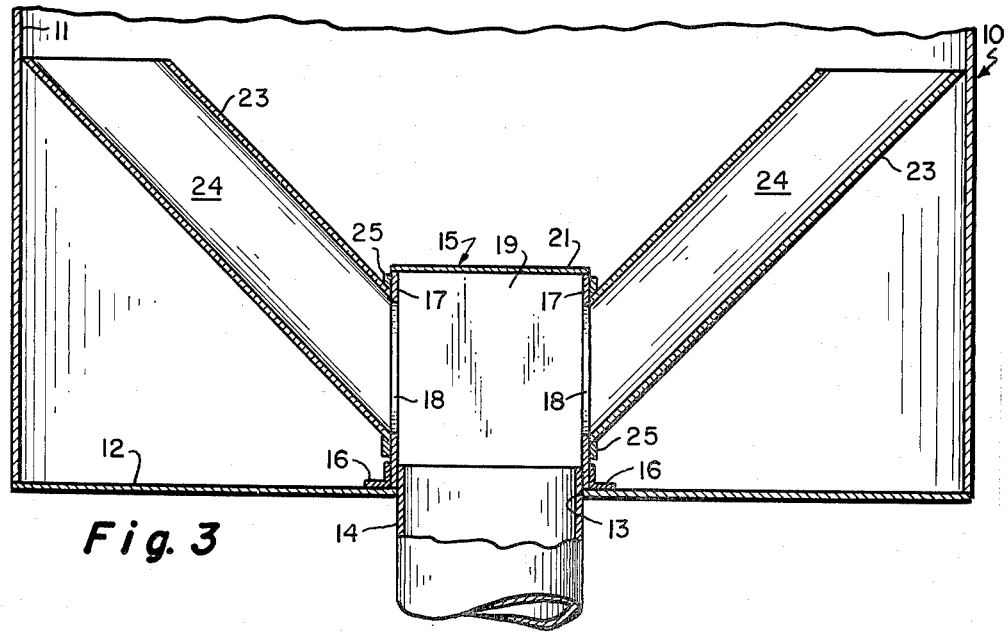

Referring now to the drawings, a standard cylindrical storage bin 10 having side wall portions 11 and a bottom portion 12 is shown having a discharge opening 13 provided with a delivery tube 14. A hopper or box 15 is positioned over the discharge outlet 13 of bin 10 and secured to the bottom 12 by any suitable means such as welding to angle braces 16.

The hopper or box 15 has a pair of side walls 17 having openings 18 formed therein, a back wall 19, and an inclined front wall 20. A cover member 21 overlies a major portion of the box 15 and has an opening 22 formed therein above the inclined front wall 20. A pair of inclined arms or pipes 23, forming passageways 24, communicate at their lower ends with openings 18 formed in side walls 17, and at their upper ends adjacent side wall portions 11 of the bin 10. The arms or pipes 23 may be secured to the side walls 17 by any suitable means such as welding to a bracer or support plate 25.

In operation, when it is desired to feed batch material from the bin 10 to a melting unit, a suitable valve (not shown) is opened to allow passage of the batch material stored within the bin to flow outwardly through the discharge opening 13 and along delivery tube 14. Flow is normally effected by gravity, however, if desired, it may be assisted by known vibratory means. As the granular batch material flows from the bin 10, fine material from the central portion of the bin enters opening 22, whereas coarse material from the edges of the bin flows downwardly through passages 24 of arms 23 and enters the hopper or box 15 via openings 18. The coarse material entering openings 18 is blended with the fine material entering opening 22 as the materials pass through the box, and are discharged as a homogeneously blended batch material through outlet 13, where it is delivered via delivery tube 14 to a melting unit.

Although I have disclosed the now preferred embodiment of my invention, it will be apparent to those skilled in the art that various changes and modifications may be made thereto without departing from the spirit and scope thereof as defined in the appended claims.

I claim:

1. In combination with a storage bin having sidewall portions and a substantially flat bottom surface provided with a discharge opening, a hopper box positioned within the storage bin and over the bottom discharge outlet for delivering homogeneous granular batch material from the storage bin, an open portion formed in an upper surface of said hopper box communicating between the interior of said box and a substantially central portion of the storage bin for flowing batch material into the hopper from the central portion of the storage bin, a plurality of inclined conduits communicating at their lower ends with the interior of said hopper box and at their upper ends terminating in open communication adjacent sidewall portions of the storage bin at a level above the upper surface of said hopper box for flowing batch material into the hopper from edge portions of the bin, and the discharge outlet communicating with the interior of said hopper for discharging a homogeneous batch mixture therefrom.

2. In combination with a cylindrical storage bin having sidewall portions and a flat bottom wall provided with a central discharge opening, a device for inhibiting segregation of granular material which would otherwise occur upon the delivery of such material from the storage bin which comprises, a hopper box positioned within such storage bin and located over the centrally disposed bottom discharge outlet extending through the flat bottom wall of the bin; said hopper box having a pair of sidewalls, a rear wall, an inclined front wall, and a cover member forming a confined blending chamber communicating with the bottom discharge outlet; an open portion formed in said top cover member above said inclined front wall communicating with said blending chamber and a substantially central portion of the storage bin for flowing batch material into said blending chamber from such central portion of the bin, an inclined tubular member extending upwardly from opposite sides of said hopper box terminating adjacent opposed sidewall portions of the storage bin and communicating at their lower ends with the blending chamber for flowing batch material into said blending chamber from edge portions of such bin.

References Cited by the Examiner
UNITED STATES PATENTS 2,994,460   8/61   Matthews _____ 222—459 X

FOREIGN PATENTS 244,224   4/47   Switzerland.

LOUIS J. DEMBO, *Primary Examiner.*

HADD S. LANE, *Examiner.*